(12) United States Patent
De Tremiolles et al.

(10) Patent No.: US 7,254,565 B2
(45) Date of Patent: Aug. 7, 2007

(54) METHOD AND CIRCUITS TO VIRTUALLY INCREASE THE NUMBER OF PROTOTYPES IN ARTIFICIAL NEURAL NETWORKS

(75) Inventors: Ghislain Imbert De Tremiolles, Vence (FR); Pascal Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 10/137,969

(22) Filed: May 3, 2002

(65) Prior Publication Data

US 2003/0023569 A1 Jan. 30, 2003

(30) Foreign Application Priority Data

Jul. 26, 2001 (EP) ................................. 01480058

(51) Int. Cl.
*G06E 1/00* (2006.01)
*G06E 3/00* (2006.01)
*G06F 15/18* (2006.01)
*G06G 7/00* (2006.01)
*G06N 3/00* (2006.01)
*G06N 3/08* (2006.01)
*G06N 3/04* (2006.01)

(52) U.S. Cl. ........................... 706/28; 706/42; 706/18; 706/25; 706/26; 706/27

(58) Field of Classification Search ................ 264/470, 264/401; 342/457, 464; 345/473; 348/92; 382/118, 155, 159, 161, 186, 187, 197, 202, 382/14; 706/20, 1, 15, 45, 13, 28, 42, 18, 706/25, 26, 27; 395/77, 21, 124, 23, 27, 395/24; 707/2; 358/1.9; 700/1, 90; 704/203, 704/222, 200, 231
See application file for complete search history.

(56) References Cited

U.S. PATENT DOCUMENTS

| | | | | |
|---|---|---|---|---|
| 5,649,070 A | * | 7/1997 | Connell et al. | ............... 706/14 |
| 2002/0194159 A1 | * | 12/2002 | Kamath et al. | ................ 707/2 |
| 2003/0018598 A1 | * | 1/2003 | Cawse et al. | ................ 706/13 |

OTHER PUBLICATIONS

Robert David, Erin Williams, Ghislain de Tremiolles, "Description and Practical Uses of IBM ZISC036", Ninth Workshop on Virtual Intelligence/Dynamic Neural Networks, Stockholm, Sweeden, Jun. 15, 1998.*

Thomas Plum, "Reliable Data Structures in C" ISBN 0-911537-04-X, copyright 1985. Chapter 3, p. 7.*

(Continued)

*Primary Examiner*—Joseph P Hirl
*Assistant Examiner*—Peter Coughlan

(57) ABSTRACT

An improved Artificial Neural Network (ANN) is disclosed that comprises a conventional ANN, a database block, and a compare and update circuit. The conventional ANN is formed by a plurality of neurons, each neuron having a prototype memory dedicated to store a prototype and a distance evaluator to evaluate the distance between the input pattern presented to the ANN and the prototype stored therein. The database block has: all the prototypes arranged in slices, each slice being capable to store up to a maximum number of prototypes; the input patterns or queries to be presented to the ANN; and the distances resulting of the evaluation performed during the recognition/classification phase. The compare and update circuit compares the distance with the distance previously found for the same input pattern updates or not the distance previously stored.

12 Claims, 15 Drawing Sheets

OTHER PUBLICATIONS

'Reliable Data Structures in C':Thomas Plum, 1985, Noble Book Press, chapter 3, p. 7.(3-7).*
SPIE Digital Library, http://spiedl.aip.org/bdt.jsp?KEY=PSISDG&Volume=3728&Issue=1&bpoc=volrange&scode=3700+-+3799, p. 1 & 4.*
'Reliable data structures in C', Thomas Plum, 1985, Noble Book Press, 3-7.*
'Description and practical uses of IBM ZISC036': David, 1999, SPIE, vol. 3728, 0277-786X/99, 198-211.*

* cited by examiner

METHOD AND CIRCUITS TO VIRTUALLY INCREASE THE NUMBER OF PROTOTYPES IN ARTIFICIAL NEURAL NETWORKS

FIELD OF THE INVENTION

The present invention relates to artificial neural networks and, more particularly, to a method and circuits adapted to virtually increase the number of prototypes that can be processed in an Artificial Neural Network (ANN).

BACKGROUND OF THE INVENTION

In today's data processing, a lot of recognition, prediction, and computation tasks are performed using reference databases used to characterize input data. Depending upon the problem to be solved, these reference databases contain patterns that are sub-images, sub-signals, subsets of data, and combinations thereof. The patterns that are stored in these reference databases are referred to herein below as prototypes. As known by those skilled in the art, these patterns are generally represented by a vector, which is an array in an n-dimensional space.

Well-known methods for characterizing unknown patterns, referred to herein as input patterns, using reference databases are based upon input space mapping algorithms. Such algorithms include K-Nearest-Neighbor (KNN) or the Region Of Influence (ROI) algorithms. The base principle of these algorithms is to compute a distance between an input pattern and each of the stored prototypes in order to find the closest pattern(s), which usually depends on predetermined thresholds. U.S. Pat. No. 5,621,863, entitled "Neuron Circuit," issued Apr. 15, 1997 to Boulet et al., assigned to IBM Corp., and incorporated by reference herein, describes artificial neural networks based on input space mapping algorithms that include innovative elementary processors of a new type, referred to as the ZISC neurons (ZISC is a registered trade mark of IBM Corp.). An essential characteristic of the ZISC neurons lies in their ability to work in parallel, which that, when an input pattern is presented to the ANN, all ZISC neurons compute the distance between the input pattern and their stored prototypes at the same time. Thus, the ZISC ANN response time regarding the totality of the distance evaluation process is constant whatever the number of prototypes, unlike the response time of a software emulation of such a process, which linearly depends upon the number of prototypes.

FIG. 1 illustrates the basic hardware that will be used to illustrate the distance evaluation technique as it is currently practiced to date in a ZISC ANN. Now turning to FIG. 1, the architecture of a neural system 100 is shown. Neural system 100 comprises a host computer 110, e.g., a personal computer, and a conventional ZISC ANN 120 that includes a plurality of neurons 130-1 to 130-n (generically referenced as 130 hereinafter). Physically, the ANN 120 can consist of a printed circuit board having a few ZISC chips, e.g., ZISCO36 chips which include 36 neurons each, mounted thereon. Each neuron, e.g. 130-1, is schematically reduced in FIG. 1 to two essential elements for the sake of simplicity: a prototype memory 140-1 (collectively, 140) dedicated to store a prototype, when the neuron has learned an input vector during the learning phase, and a distance evaluator 150-1 (collectively, 150). Data-in bus 160 sequentially applies the set of components of an input pattern to all neurons 130 of the ANN 120 in parallel and data-out bus 170 transmits the results of the distance evaluation process, typically the distance and the category (and other or more specified parameters could be envisioned as well) to the host 110. As taught in the above in U.S. Pat. No. 5,621,863, when an input pattern is fed into each neuron 130 through data bus 160, it is compared in the distance evaluator 150 with the prototype stored therein, so that the result generally consists of a pair of values: a distance and the category. For the sake of simplicity, the category register is not shown in FIG. 1; instead, it is considered to be included in the distance evaluator 150. As apparent in FIG. 1, the ZISC ANN architecture is such that all the distance evaluations are simultaneously performed in all the neurons composing the ANN.

The conventional ANN 120 depicted in FIG. 1 is limited to the storage of a fixed number of prototypes, as determined by the number, n, of neurons. In this case, the number of prototypes p is such that $p<=n$. However, depending upon several factors like the number, m, of prototype components and the required accuracy of the ANN 120, modern real-time applications may use from a few thousand to several hundreds of thousands of ZISC neurons. It is not always realistic to use as many ZISC neurons as it would be required. Even with the dramatic increase of the level of integration that has been achieved in recent years, which permits integration of millions of transistors on a single piece of semiconductor, just a few hundred neurons can be embedded in a silicon chip. This, in turn, would allow an integration of a few thousand neurons on one large printed circuit board. As a result, it would be quite complex and expensive to build an ANN physically composed of several hundreds of thousands of neurons.

There is, thus, a real need to implement a ZISC ANN that could process as many prototypes as necessary without requiring complex and thus expensive hardware, in order to meet present and future real time applications. It is accordingly a major aim of the method and circuits of the present invention to remedy the limitations and shortcomings of the FIG. 1 conventional ANN architecture that are recited above.

SUMMARY OF THE INVENTION

It is therefore an advantage that aspects of the present invention provide a method and circuits adapted to virtually increase the number of prototypes that can be processed in a conventional input space mapping based Artificial Neural Network (ANN).

It is another advantage that the aspects of the present invention provide a method and circuits adapted to process a number of prototypes in a conventional ANN that can be much greater than the number of neurons physically existing in the ANN.

It is still another further advantage that the aspects of the invention provide an improved ANN constructed around a conventional ANN that is adapted to process a number of prototypes that is totally independent of the number of neurons.

It is another advantage of the aspects of the invention that they provide a method and circuits adapted to virtually increase the number of prototypes that can be processed in a conventional ANN without significantly increasing the hardware complexity thereof.

It is still another advantage that aspects of the invention provide a method and circuits adapted to virtually increase the number of prototypes that can be processed in a conventional ANN at very low cost.

The accomplishment of these and other related advantages is achieved by the techniques of the present invention.

The techniques of the present invention allow more prototypes to be used in calculations when performing calculations with a neural network that has a predetermined, fixed number of neurons. Each neuron in the neural network is able to store a prototype and determine a local result of a comparison between the prototype and an input pattern. Different comparison methods may be used, but a preferred comparison is a distance measure between the prototype and the input pattern. The neural network determines a global result from all the neurons. This global result is generally the minimum of the local results, but other measures may be used.

Techniques of the present invention partition the prototypes into "slices," wherein each slice usually contains a number of prototypes equal to the number of neurons. A slice is loaded into the neural network, then input patterns are applied to the neural network, and the global results are stored. Another slice is loaded into the neural network, input patterns are applied to the neural network, and new global results are determined and compared to the old global results based on certain criteria. Generally, the minimum between the new and old global results is selected to be retained, although other criteria may be used. The retained new global results are preferably stored by updating (if necessary) the old global results with the new global results. Preferably, this process continues until all slices are loaded, all input patterns are applied for all slices, and the global results are determined and retained according to the criteria.

A more complete understanding of the present invention, as well as further features and advantages of the present invention, will be obtained by reference to the following detailed description and drawings.

DETAILED DESCRIPTION OF PREFERRED EMBODIMENTS

A problem solved by the invention is to process a number, p, of prototypes with a conventional Artificial Neural Network (ANN) comprised of n physical neurons, wherein p is greater than n, even of several orders of magnitude. According to a major feature of the present invention, the components of all the prototypes to be processed are saved in a memory, typically a Read/Write memory, forming thereby a first database. The component values stored in the the first database can be read at any time to restore the component values of any neuron of the ANN whenever desired. Likewise, all the q input patterns that have to be evaluated are stored in another memory, typically a R/W memory, to form a second database. Finally, the results of the distance evaluation process, and more generally the results of the recognition phase (i.e., not limited to only the distance and category values as usual, but to any other specified parameter as well), are also stored in a R/W memory to form a third database. The results are "intermediate" results in the course of the distance evaluation process, and become "final" results at the end thereof. Depending upon the application, these R/W memories are either part of RAM memory in a host computer or are implemented as independent memory units.

Figure 1:
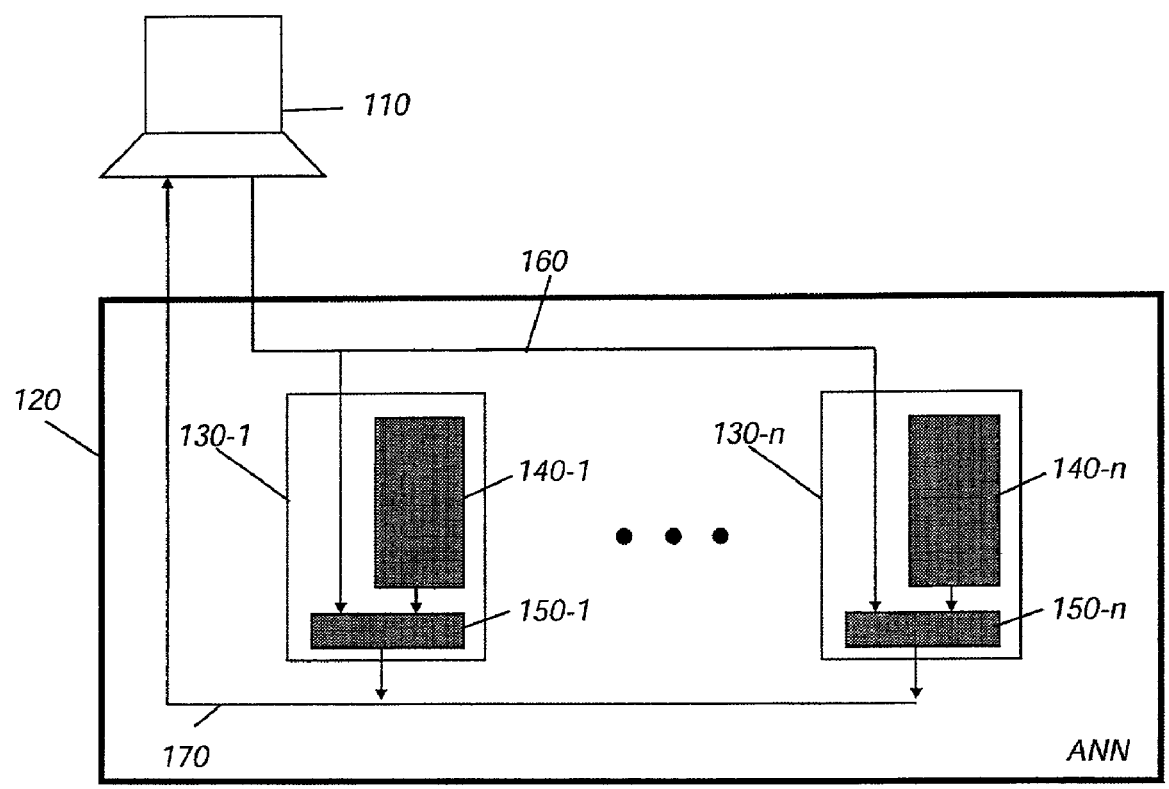
FIG. 1 schematically shows the architecture of a neural system, in accordance with a preferred embodiment of the invention.
Figure 2:
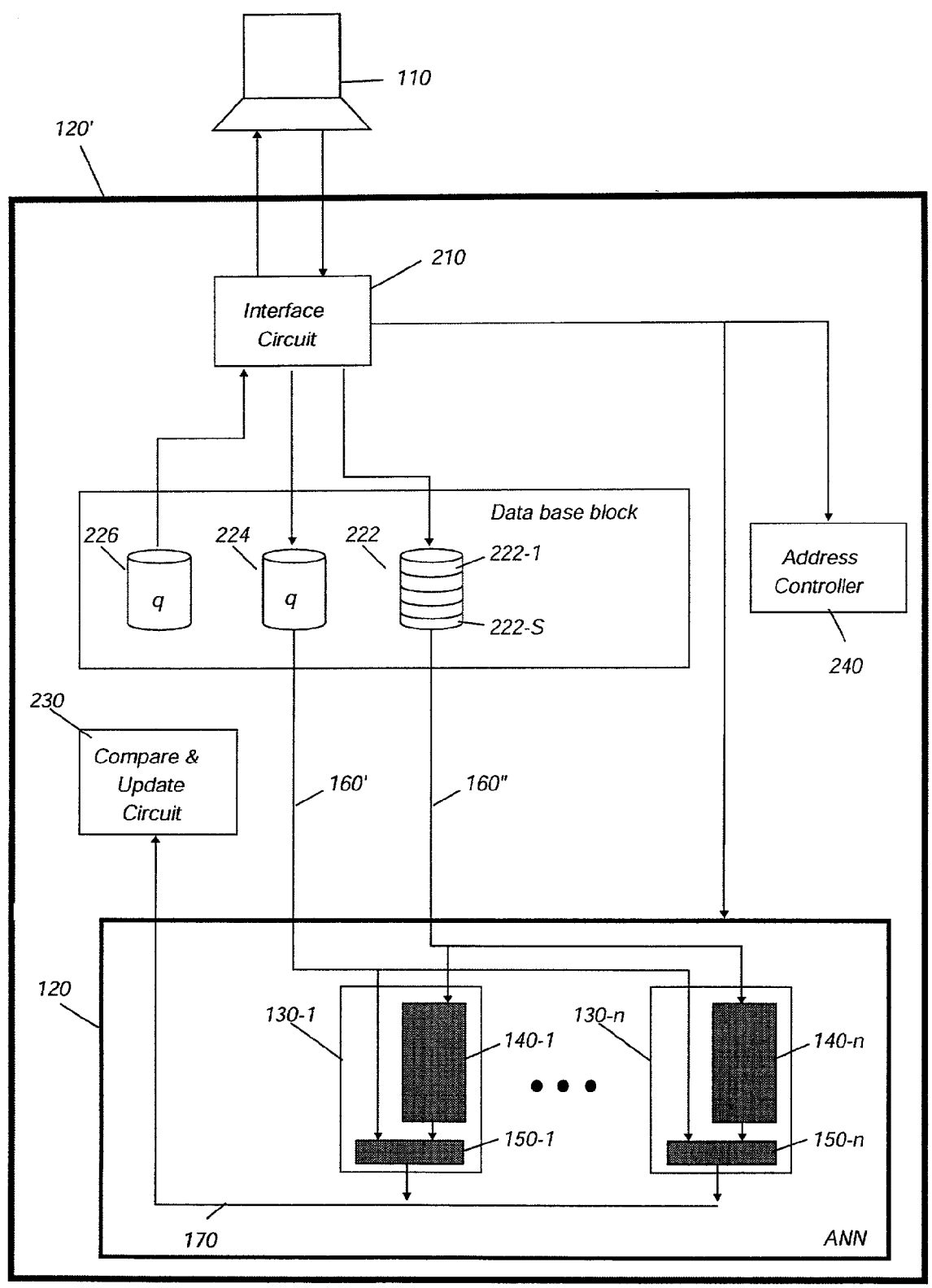
FIG. 2 shows the architecture of the neural system of FIG. 1 modified to implement an improved ANN according to the present invention, in accordance with a preferred embodiment of the invention.

FIG. 2 shows the architecture of the neural system 100 of FIG. 1, modified to implement the improved ANN according to the present invention, wherein the number of prototypes involved in the recognition phase is greater than the number of ZISC neurons physically available in the conventional ANN 120. Like reference numerals (with prime) are used through the several drawings to designate identical (corresponding) parts.

Now turning to FIG. 2, a novel neural system architecture 200 comprises of host computer 110 and the improved ZISC ANN now referenced 120'. Improved ANN 120' still comprises the conventional ANN 120 of FIG. 1, an interface circuit 210, a database block 220 comprised of three databases 222, 224 and 226, and finally a compare and update circuit 230. A role of interface circuit 210 is to receive the data from the host computer 110 for a proper dispatch thereof to the three databases in database block 220, conversely, to transfer the contents of the databases in the host computer 110. As apparent in FIG. 2, the database block 220 includes three databases. The first database 222 contains the prototypes, the second database 224 contains the input patterns, and the third database 226 contains the results of the distance evaluation process. The first database 222, also referred to as the prototype database, is split into s sub-databases or slices 222-1 to 222-s, each slice being adapted to store up to n prototypes. As a result, each slice contains n prototypes except the last one (if any) which contains the remaining prototypes. The first database 222 contains p×m values (when it is completely filled, it contains n×s×m values). The second database 224 is also referred to as the Query database because the input patterns to be presented to the improved ANN 120' are often referred to as queries in the literature. The second database 224 thus contains q×m values. Finally, the third database 226, also referred to as the Result database, contains the intermediate results of the distance evaluation process performed during the recognition/classification phase. Additionally, at the end of this process, the third database 226 contains the final distances, DIST, and the associated categories, CAT. If the results are limited to the distance and category parameters, the third database thus contains 2×q values.

Because other specified parameters could be envisioned as well, the third database 226 may contain k×q values, if there are k different specified parameters. The compare and update circuit 230 compares the global results generated by the ANN for each query (input pattern presentation) with corresponding results that were previously stored in the third database 226 and updates them whenever necessary. The address controller 240 cooperates with the interface circuit 210 to send adequate addresses to select the right data in the three databases. Note that in the particular implementation of database block 220 in host computer 110, the function of address controller 240 is fulfilled by the host computer 110 itself.

Figure 3A:
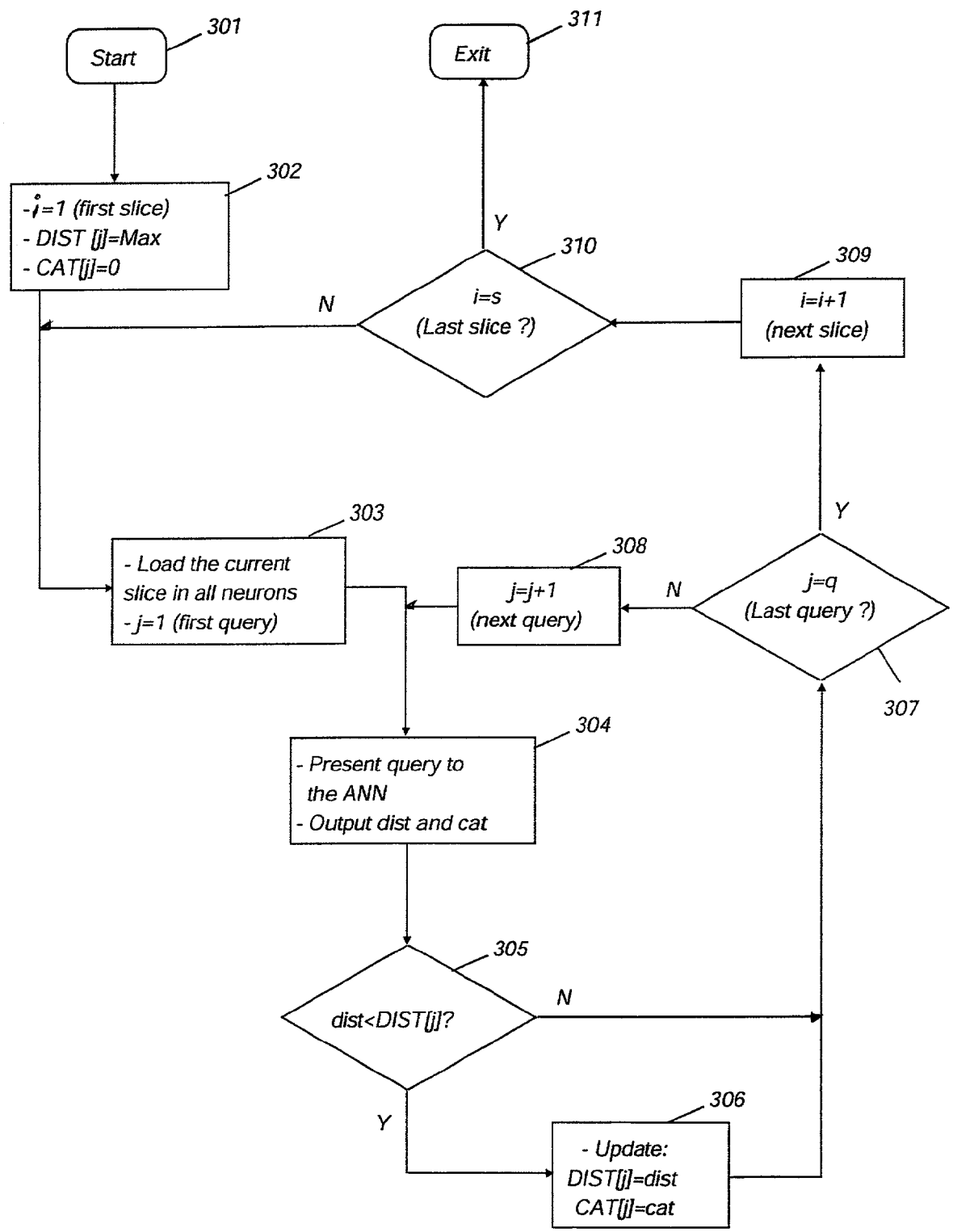
FIG. 3a shows the flow-chart summarizing main steps of the method of the present invention, in accordance with a preferred embodiment of the invention.

One method of the present invention will be now described in conjunction with FIG. 3a, which shows a technique for processing p prototypes by using a conventional ANN comprised of n physical neurons. Two current variables will be used, i (called a sub-database or slice index), which varies from 1 to the number, s, of slices, and j (called a query index), which varies from 1 to the number, q, of input patterns to be presented (i.e., queries). The process of FIG. 3a is started in box 301. In box 302, the first current variable i is set to 1 and the final distance and the category values for all the q input patterns are initialized, for example to the maximum distance value (Max) and zero respectively. Note that Max is the maximum value that can be coded. As apparent in box 303, the components of all prototypes stored in the current slice are loaded in the n neurons of the ANN 120 and the second current variable j is set to 1.

A neural system implementing the method of FIG. 3a, such as neural system 200, is now ready for the first query. In box 304, a query is presented to the ANN, the distance, dist, and the associated category, cat, that are determined as standard for that query are intermediate results. The computed distance dist is compared with DIST (j) in box 305. If dist<DIST(j), DIST(j) and CAT(j) are updated, i.e. DIST (j)=dist and CAT (j)=cat in box 306. If dist>=DIST(j) or after an update has been performed in box 306, a new test is performed in box 307 to determine if it is the last query that has been processed or not. If not, i.e., if j<q, variable j is incremented (i.e., j=j+1) in box 308 and a new query is presented as depicted in box 304. On the contrary, if j=q, this means that all the queries have been processed for that slice i and another slice (if any) must be now considered. To that end, the variable i is incremented (i=i+1) in box 309. A new test is performed in box 310 to determine whether or not the variable i has reached its end, i.e. if i=s. If yes (Y), the process stops in box 311, which means that there are no more slices to be processed. At the end of the distance evaluation process (or recognition phase), the values that are then stored in database 226 are the final results mentioned above. The final results (the minimum distance DIST and the associated category CAT) are then made available to the host computer 110. If not (N), the process continues by returning to box 303.

Figure 3B:
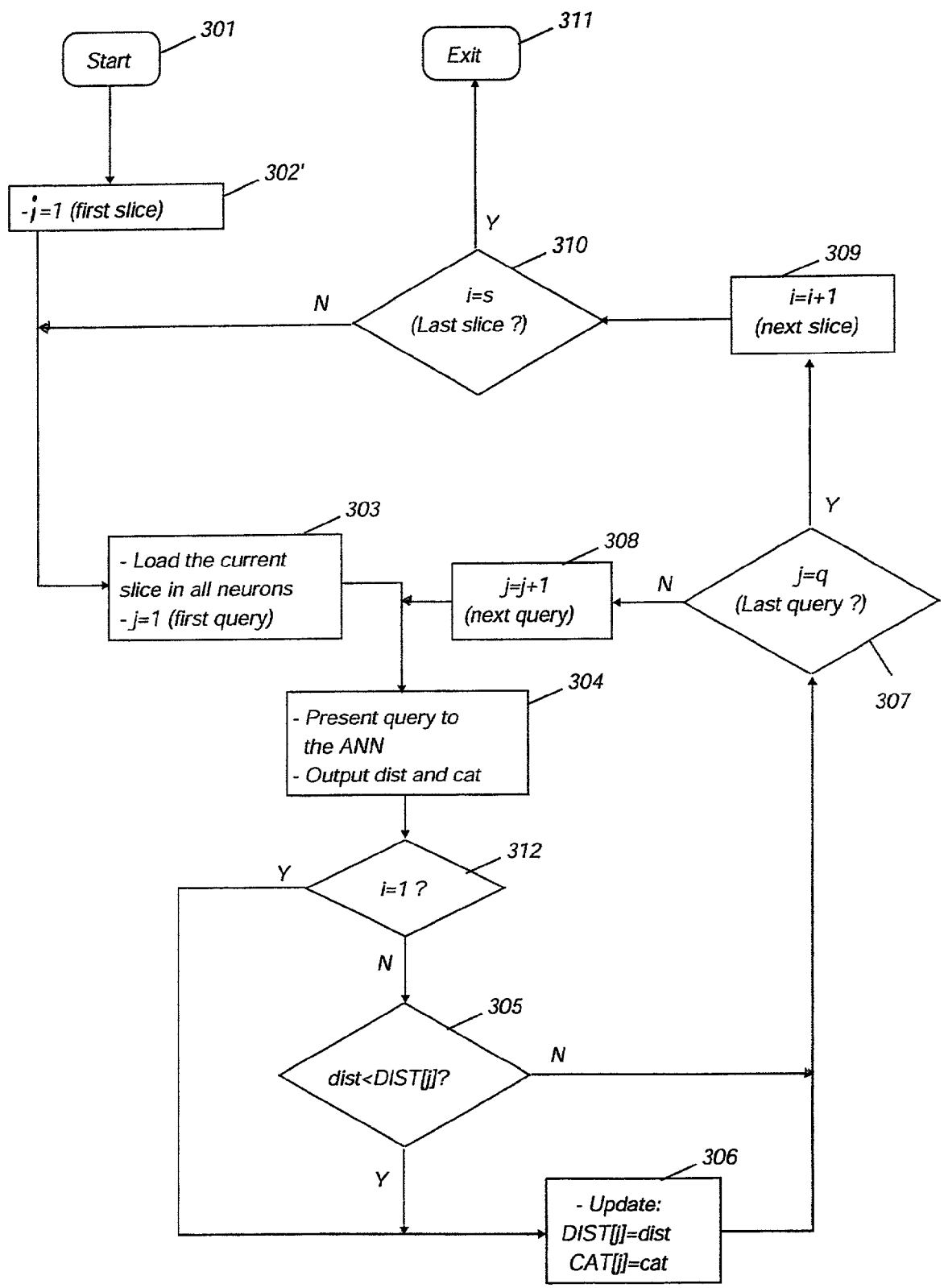
FIG. 3b shows a variant of the FIG. 3a flow-chart, in accordance with a preferred embodiment of the invention.

FIG. 3b shows a variant of the method described by reference to FIG. 3a. In this case, the initializations of the distance DIST and the category CAT that were performed in box 302 (FIG. 3a), are not performed is this box (see new box 302' of FIG. 3b). On the other hand, an additional step performed in box 312 is now required to test whether i=1 or not. If not, the process continues by the test performed in box 305, otherwise the process leaps directly to box 306.

Note that in the above examples, the results simply consist of a distance and a category, but the above reasoning can be generalized to more distances (or categories) and/or to other specified parameters (such as thresholds) as well.

The method of the present invention shown in FIG. 3a will be now illustrated by reference to FIGS. 4a-4k.

In FIGS. 4a-4k, only the Database block 220 and the conventional ANN 120 of improved ANN 120' are represented. Consistent with FIG. 2, the ANN 120 is limited to three neurons (n=3). Assume an application, for the sake of illustration, where there are five prototypes (p=5), each one having three components (m=3), are required and that four input patterns (q=4) must be classified. As apparent in FIGS. 4a-4k, the contents of the three databases (222, 224 and 226) will be indicated at each main processing step.

Figure 4A:
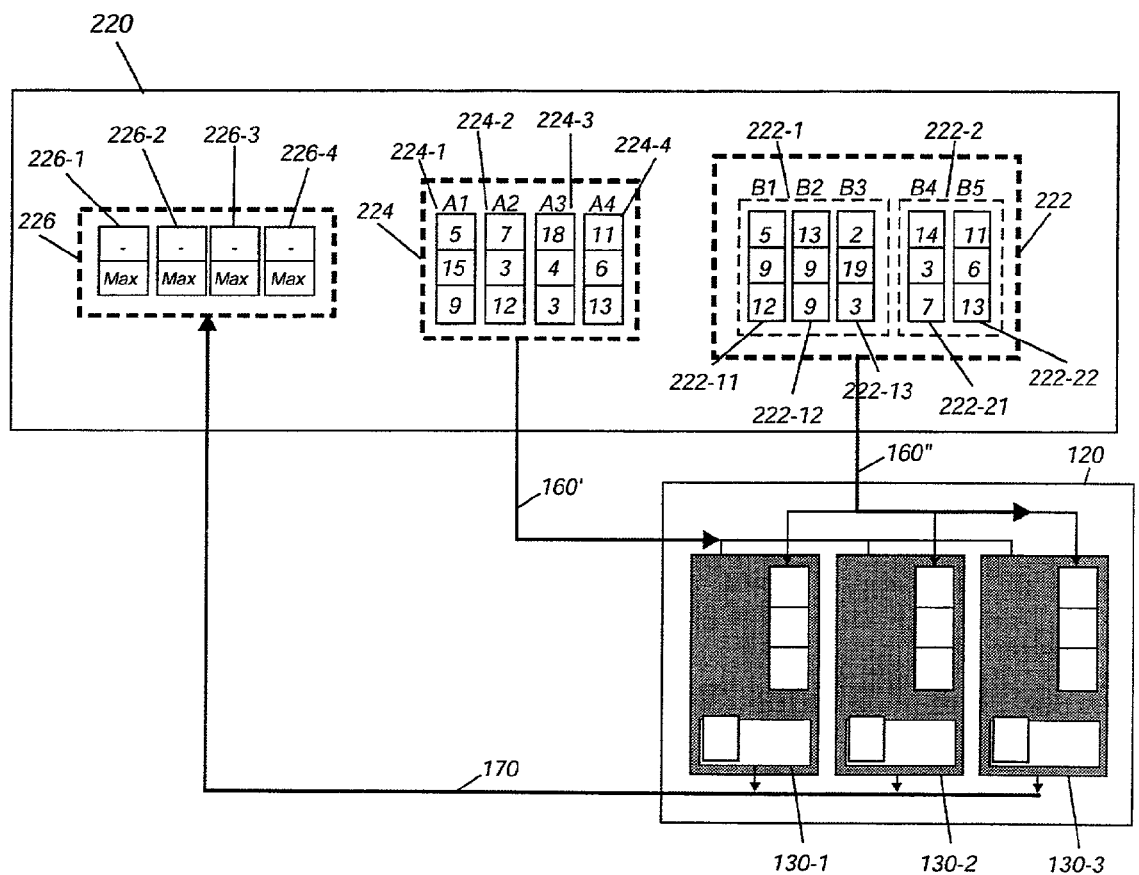
FIGS. 4a-4k show a detailed example to illustrate the method of the present invention.

Now turning to FIG. 4a, three prototypes B1 (5,9,12), B2 (13,9,9) and B3 (2,19,3) and two prototypes B4 (14,3,7) and B5 (11,6,13) are respectively stored in first and second slices referenced 222-1 and 222-2 of Prototype database 222 at specific memory locations thereof. As apparent in FIG. 4a, four input patterns A1 (5,15,9), A2 (7,3,12), A3 (18,4,3) and A4 (11,6,13)) are stored in the Query database 224 at four memory locations (224-1 to 224-4). In this exemplary embodiment, the global results of the distance evaluation process found by the ANN at each input pattern presentation (i.e., the distance and the category) are stored in two positions (lower and upper respectively) at four memory locations (226-1 to 226-4) in the Result database 226. There are as many memory locations (226-1 to 226-4) in the Result database 226 as they are memory locations (224-1 to 224-4) in the Query database 224. At initialization, for each memory location of the Result database 226, the content of the upper position (i.e., the category) is irrelevant, while the maximum distance Max is stored in the lower position thereof. As mentioned above, the category register is illustrated in FIG. 4a as being a part of the distance evaluator.

Figure 4B:
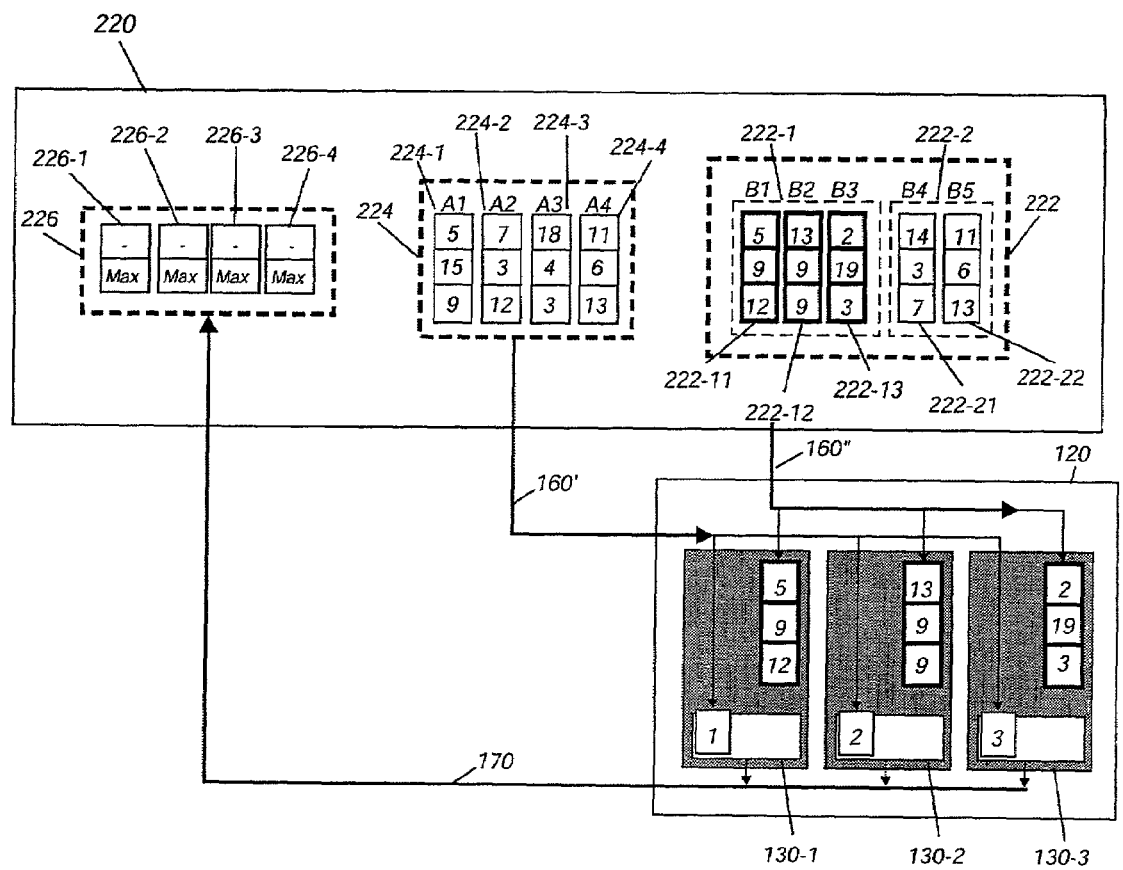

Referring to FIG. 4b, the components of prototypes B1-B3 of the first memory slice (222-1) are loaded in the prototype memory of their respective neuron via bus 160". Note that the category that is associated to each prototype is its rank for the sake of illustration. In other words, the category of prototype B1 is 1.

Figure 4C:
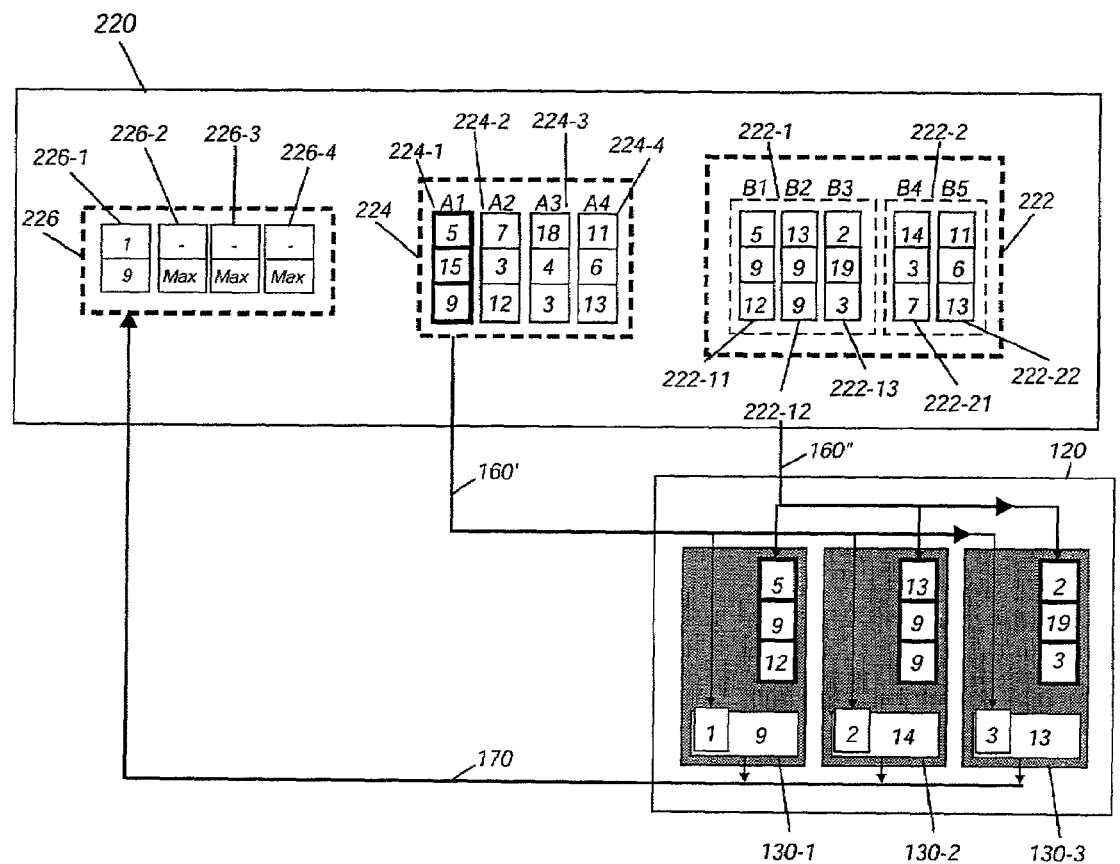

Referring to FIG. 4c, the first input pattern A1 is presented to the ANN 120 (first query) via bus 160' and the distances are computed. In this case, the L1 norm is used (see the above mentioned U.S. Patent for the details of the calculation technique). The three distances that are found (i.e., 9, 14 and 13) for neurons 130-1, 130-2 and 130-3 are local results. The value of the minimum distance found is 9, which corresponds to the first prototype. The values of this distance and associated category (i.e., 9 and 1, respectively) are global results which represent the reaction of the ANN 120 to the first input pattern presentation. These values are stored at memory location 226-1 in their respective positions via bus 170.

Figure 4D:
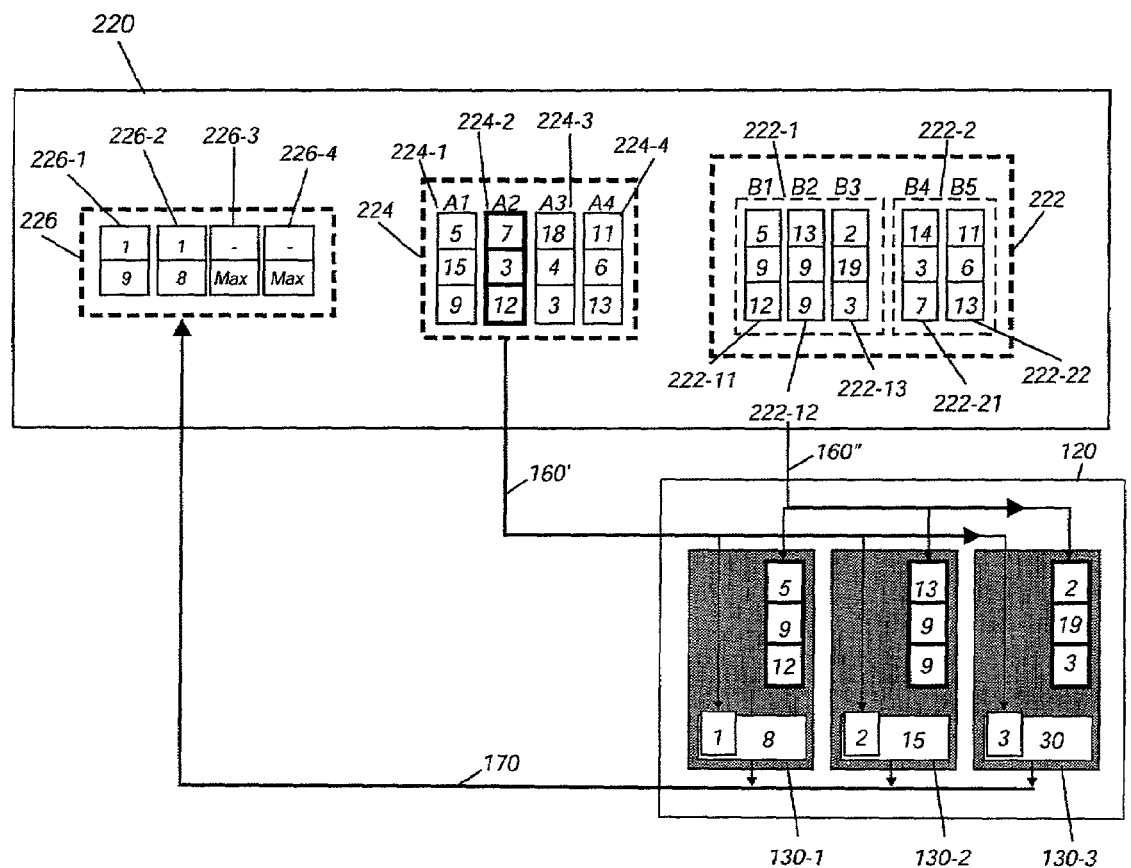

Referring to FIG. 4d, a similar process is applied to input pattern A2 and the minimum distance and associated category values (i.e., 8 and 1, respectively) are stored in their respective positions at memory location 226-2.

Figure 4E:
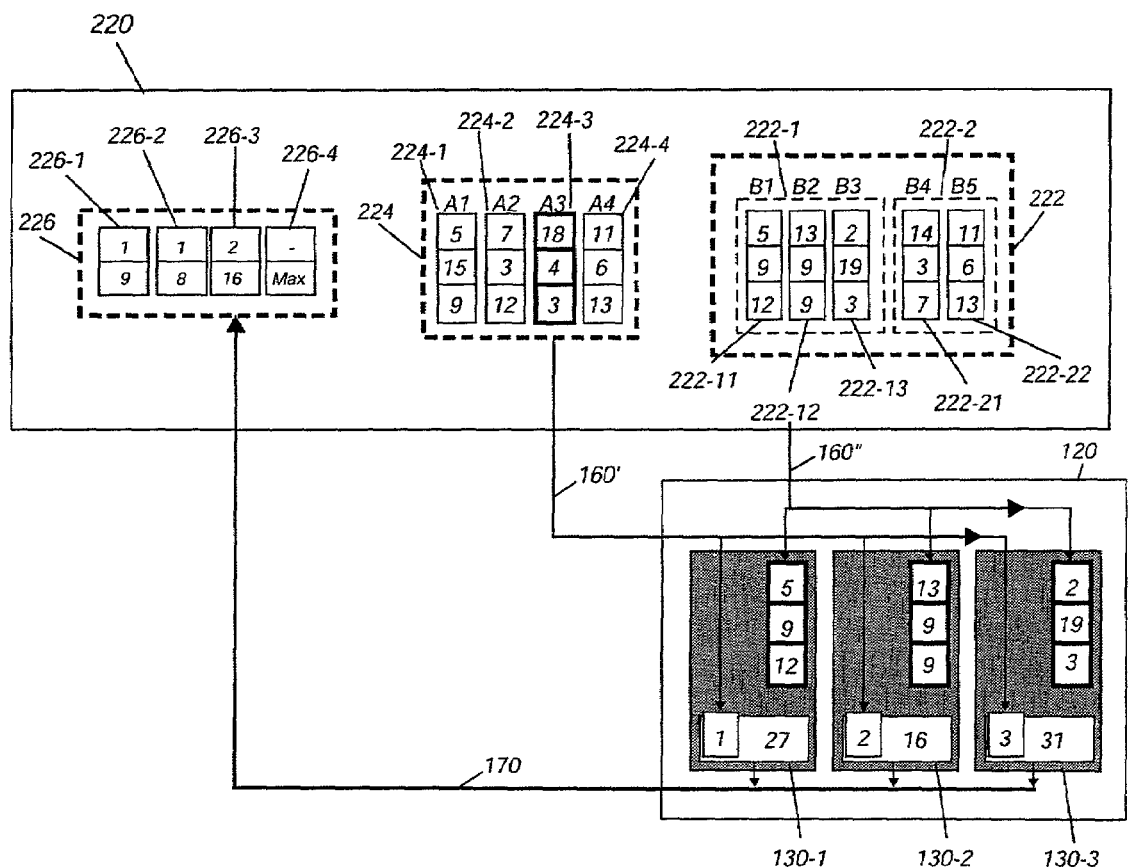

Referring to FIG. 4e, the process continues with the presentation of input pattern A3. The minimum distance found by prototype B2 is 16 and thus the category is 2 (i.e., the category of B2). These values are stored in their respective positions at memory location 226-3.

Figure 4F:
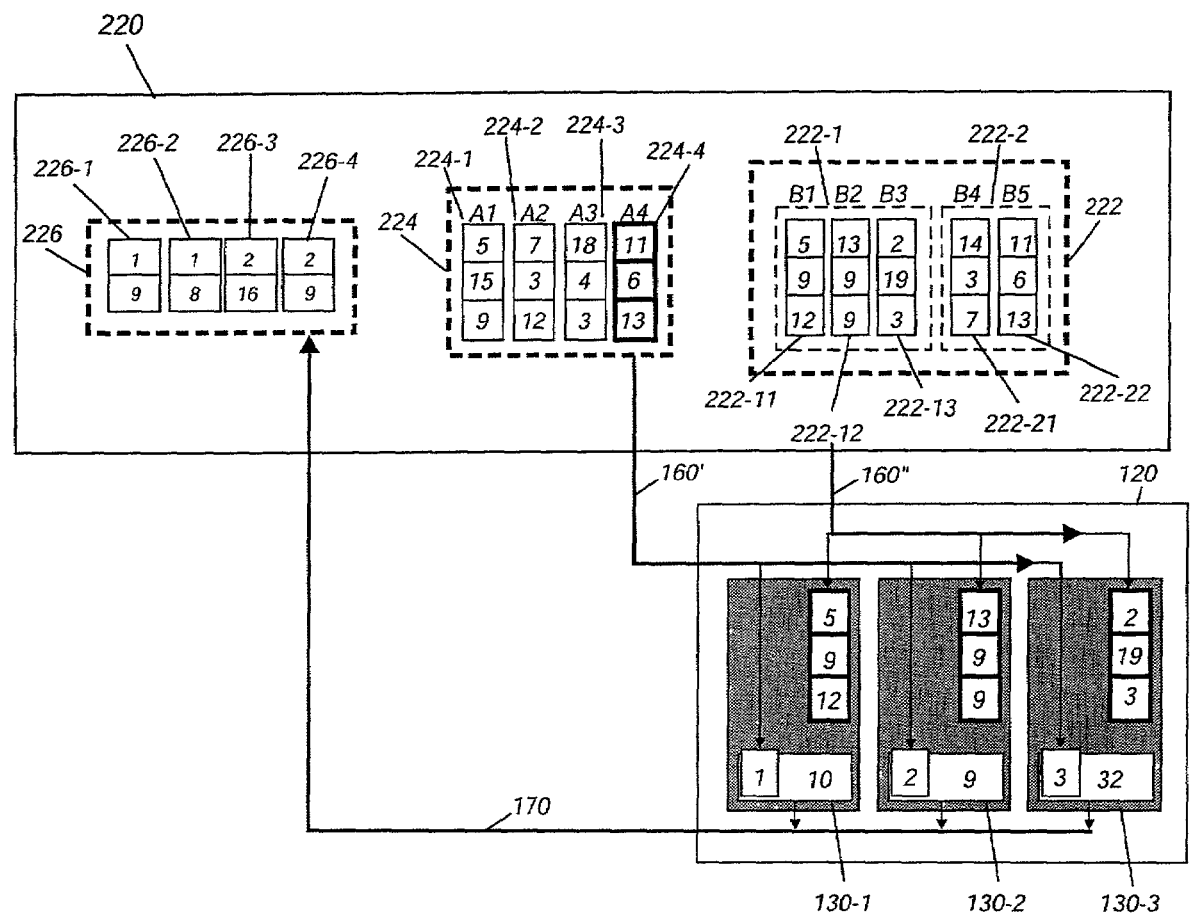

Referring to FIG. 4f, the process continues with the presentation of the last input pattern A4. The minimum distance (i.e. 9) is found by prototype B2 and thus the category is 2. These values are stored in their respective positions at memory location 226-4.

At this stage of the process, all the prototypes of the first slice have been processed and the process then continues with the prototypes of the second slice. Note that, because as previously mentioned, Max is the maximum distance that can be coded in the neural system 200, all distances being necessarily lower than or equal to this value, the Max value is overwritten at each query in the distance position at the corresponding memory location of the Result database 226.

Figure 4G:
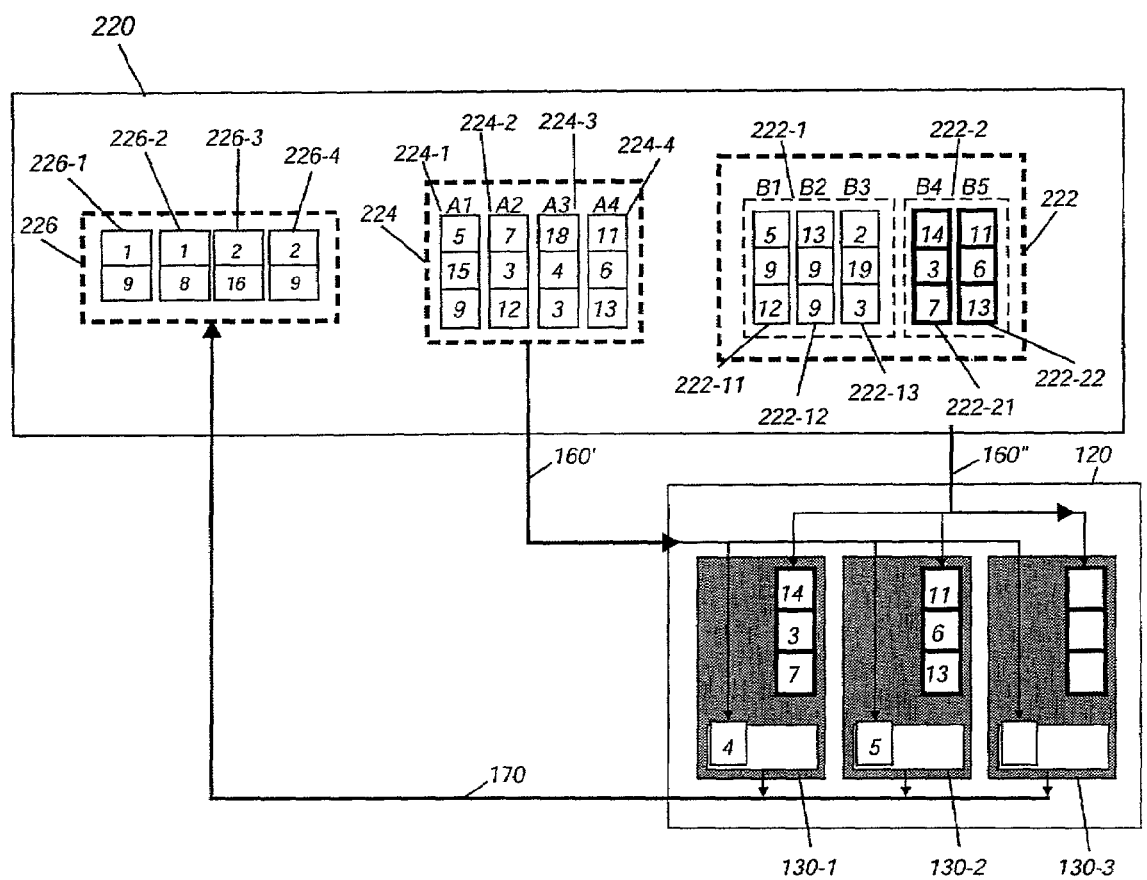

Referring to FIG. 4g, the second slice 222-2 containing prototypes B4 and B5 is loaded in the two first neurons of the ANN via bus 160". Note that the categories have been changed accordingly in their respective category registers.

Now starts a new presentation of input patterns A1-A4 to the ANN 120 in order to process them in relation to the new set of prototypes.

Figure 4H:
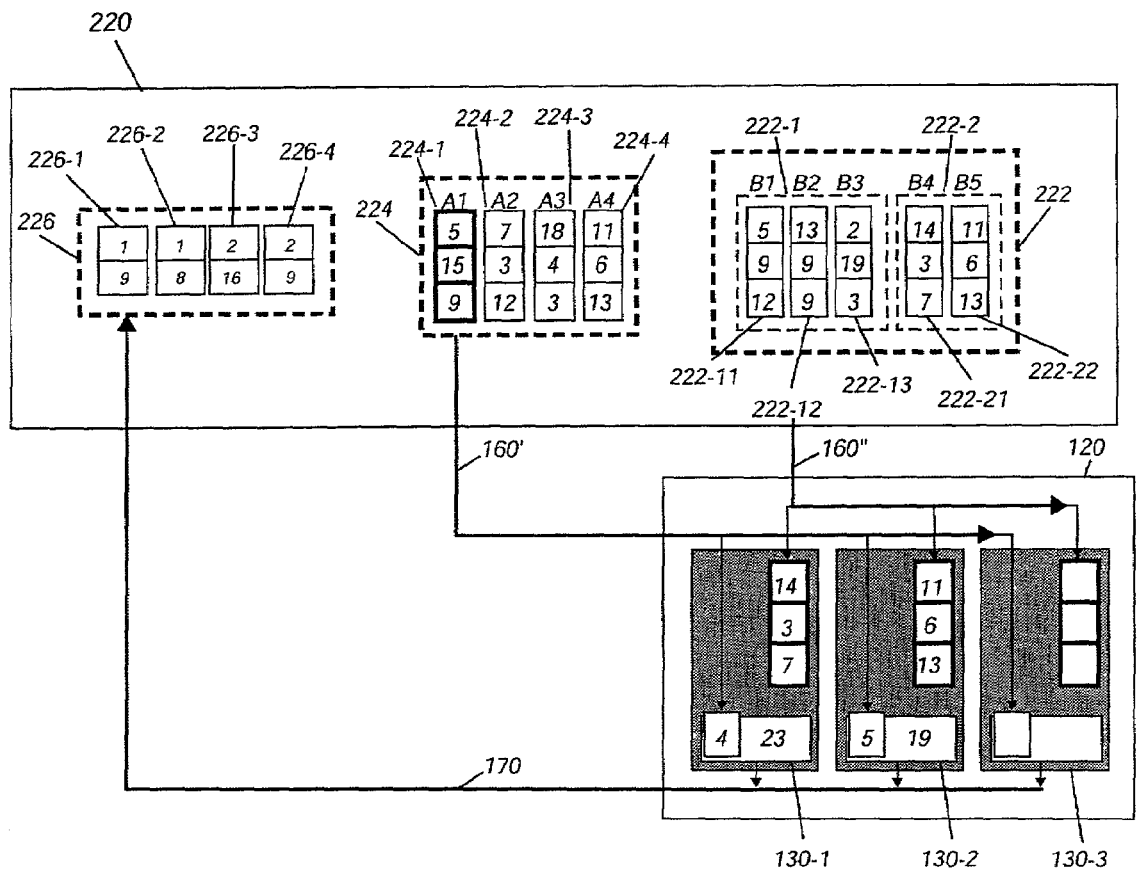

Referring to FIG. 4h, the input pattern A1 is presented, and the distances with the stored prototypes B4 and B5 are computed. Because these distances are greater than the distances that were previously found, no change is made at memory location 226-1.

Figure 4I:
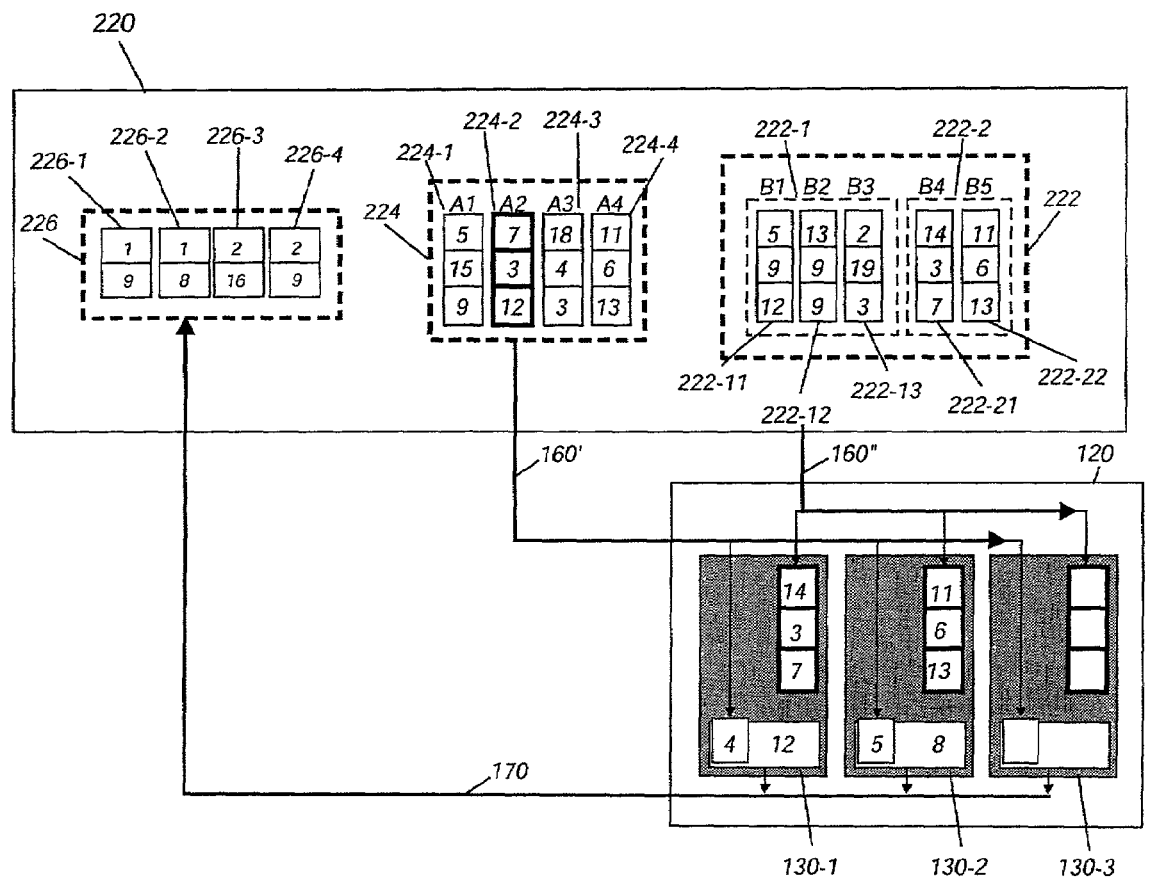

Referring to FIG. 4i, the presentation of input pattern A2 does not result in any change at memory location 226-2 because the distance that is found (i.e., 8) is equal to the distance previously stored.

Figure 4J:
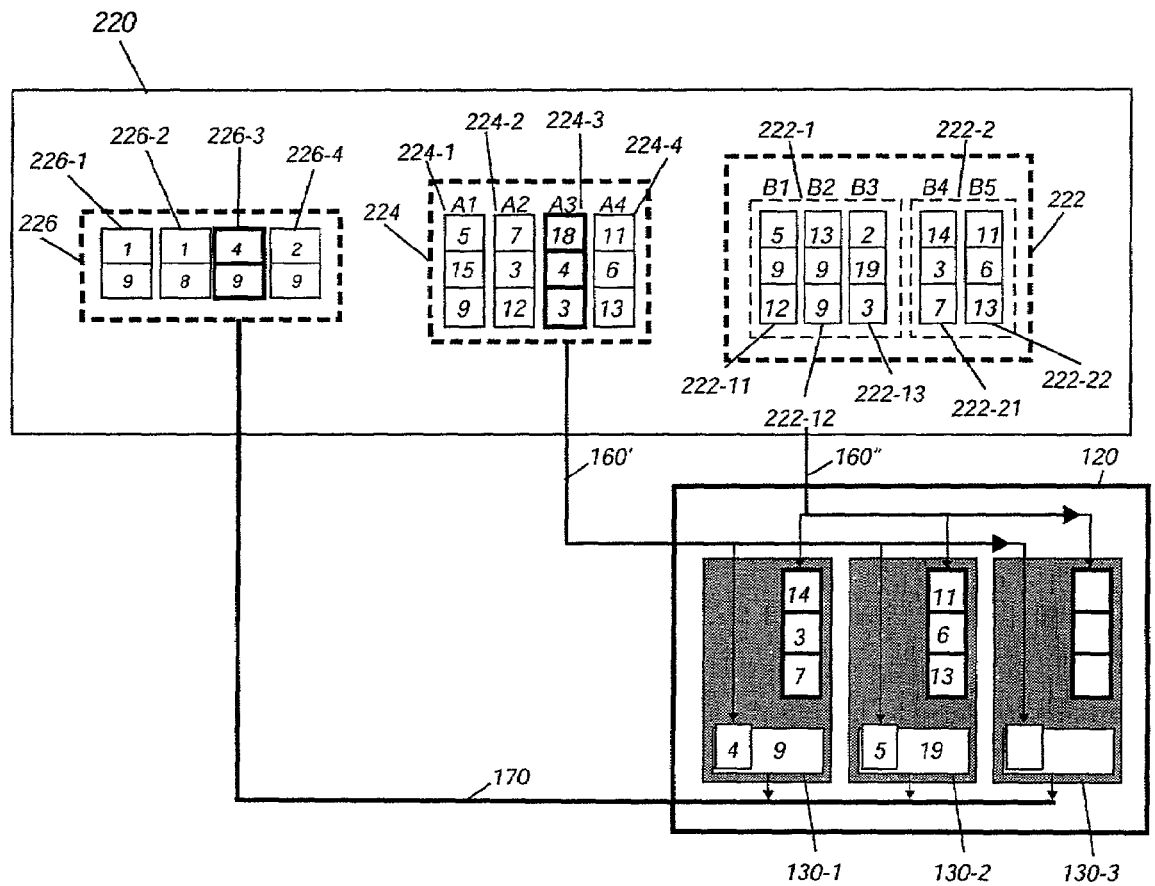

Referring to FIG. 4j, the presentation of input pattern A3 leads to a distance value of 9, lower than the distance previously stored at memory location 226-3 equal to 16, which is thus overwritten. As a result, the new distance value now becomes 9 and the new category is 4.

Figure 4K:
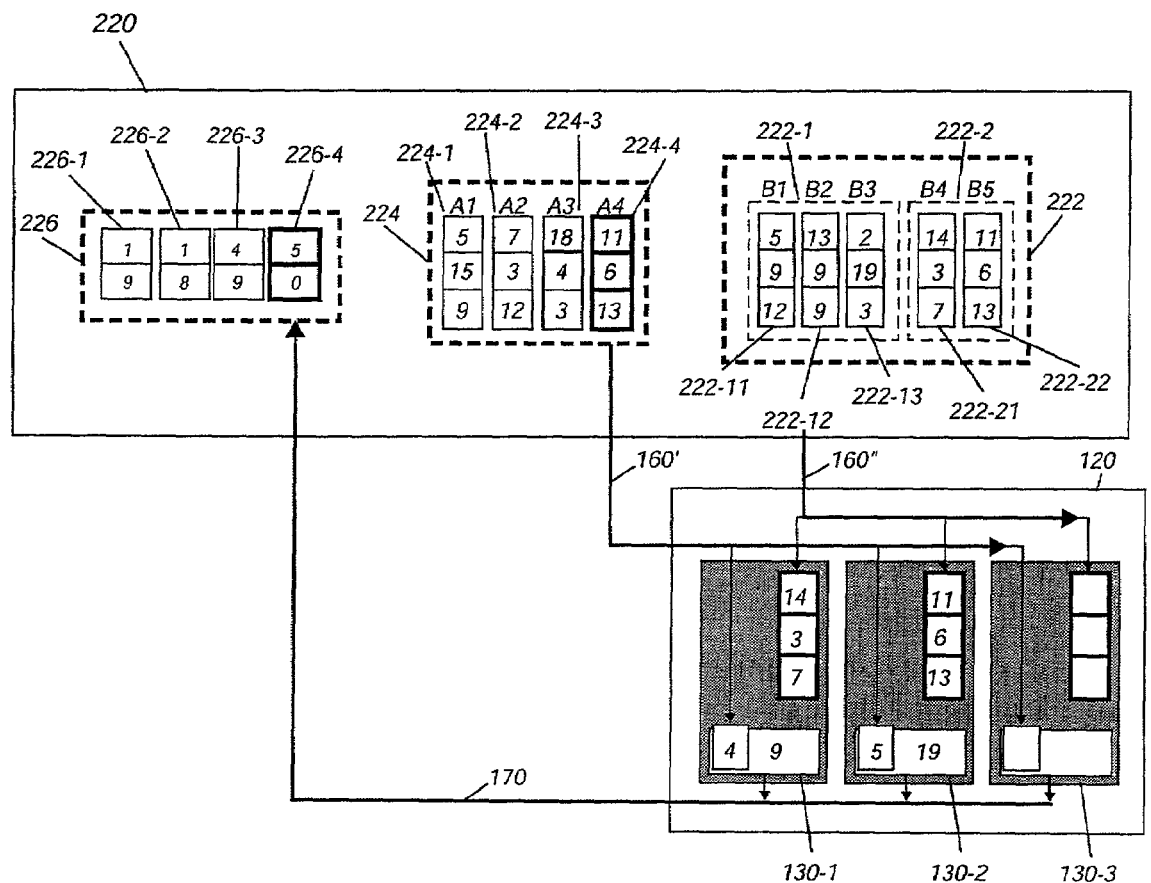

Referring to FIG. 4k, the presentation of input pattern A4 leads to a distance value of 0, lower than the distance previously stored at memory location 226-4 equal to 9 which is thus overwritten. As a result, the new distance value now becomes 0 and the new category is 5.

The neural system 200 is thus able to store five prototypes, then to compare four input patterns A1-A4 with these five prototypes with the support of an ANN physically composed of only three neurons, at the only cost of loading the prototypes in two steps. Moreover, the above description clearly demonstrates that, according to another major feature of the present invention, the number q (q=4 in this example) of queries is totally independent of the number n (n=3) of neurons and of the number p (p=5) of prototypes. As a consequence, the number of processed prototypes can be much greater than the number of neurons. In image processing, experiments have been conducted and have shown that more than $10^6$ prototypes and a similar number of queries could be processed with an ANN comprised of only $10^3$ physical neurons. In this case, the number s of slices was $10^3$.

While the description of the preferred embodiment is based upon ZISC neurons, it is to be understood that the invention can be used with whatever kind of elementary processors working with a single instruction multiple data mode of operation.

It will be apparent to those skilled in the art that various modifications may be made in the method and circuits illustratively described therein, without departing from the spirit or scope of the invention as expressed in the following claims.

What is claimed is:

1. A device to virtually increase a number of prototypes of a neural network, comprising:
   a neural network formed by a plurality of neurons, each neuron having a prototype memory dedicated to store a prototype and an evaluator to generate a local result of an evaluation based on a comparison between an input pattern presented to the neuron and the prototype stored therein, wherein the neural network is adapted to generate, according to at least one specified parameter and the local results, a global result corresponding to the input pattern;
   a memory coupled to the neural network and comprising a plurality of prototypes, a plurality of input patterns to be presented to the neural network, and an amount of storage space to store a predetermined number of global results, wherein each of a plurality of slices is associated with a plurality of the prototypes and wherein each slice is a subset of a set of prototypes; and
   a circuit coupled to the memory and configured to compare, according to predetermined criteria, a current global result from a current slice with a previously obtained global result from a previous slice, wherein both the current and previously obtained global result are determined from the same input pattern, and wherein the circuit can store a new global result in the memory based on the comparison.

2. The device of claim 1 wherein the prototypes are stored in a first database, the input patterns are stored in a second database, and the global results are stored in a third database.

3. The device of claim 2 wherein the first, second and third databases are independent units.

4. The device of claim 1 further comprising a computer forming thereby a neural system.

5. The device of claim 4 wherein the first, second and third databases are part of the memory of the computer.

6. The device of claim 5 further comprising.
   a database block containing the first, second and third databases; and
   an interface adapted to transfer data between the computer and the database block and to generate control signals used to address the databases and the neural network.

7. The device of claim 1 wherein the at least one specified parameter includes a distance.

8. The device of claim 7 wherein the evaluator in each neuron is a distance evaluator adapted to compute the distance between the input pattern presented to the neural network and the prototype stored in the corresponding prototype memory of the neuron.

9. The device of claim 8 wherein the predetermined criteria is minimum distance between current and previously obtained global results.

10. The device of claim 8 wherein the at least one specified parameter further include a category and wherein each evaluator includes a category register to store the category associated with a corresponding the prototype.

11. A method for increasing the number of prototypes to be processed in a neural network having a predetermined number of neurons, comprising:
   a) partitioning a plurality of prototypes to be processed into a number of slices, wherein the number of prototypes is greater than the predetermined number of neurons of the neural network, wherein each slice is a subset of a set of prototypes;
   b) presenting one of a plurality of input patterns to the neural network for evaluation, the neural network producing a global result based on at least one specified parameter;
   c) comparing, according to predetermined criteria, a current global result from a current slice with a previously obtained global result from a previous slice;
   d) retaining, based on the predetermined criteria, either the current or previously obtained global result.
   e) repeating steps b), c) and d) until all the input patterns have been presented to the neural network; and
   f) repeating steps b) to e) until all the slices have been loaded.

12. The method of claim 11, wherein the at least one specified parameter includes a distance and a category, and the predefined criteria include a determination of a minimum distance, so that, for each input pattern, final results comprise the minimum distance and the associated category.

* * * * *